United States Patent [19]

Lindner et al.

[11] Patent Number: 4,522,959

[45] Date of Patent: Jun. 11, 1985

[54] THERMOPLASTIC COMPOSITIONS IN POWDER FORM

[75] Inventors: Christian Lindner, Cologne; Karl-Heinz Ott, Leverkusen; Hans-Eberhard Braese, Cologne, all of Fed. Rep. of Germany

[73] Assignee: Bayer Aktiengesellschaft, Leverkusen, Fed. Rep. of Germany

[21] Appl. No.: 594,284

[22] Filed: Mar. 28, 1984

[30] Foreign Application Priority Data

Apr. 7, 1983 [DE] Fed. Rep. of Germany ....... 3312540

[51] Int. Cl.$^3$ ................................................ C08J 3/00
[52] U.S. Cl. ...................................... 523/335; 525/83; 525/192; 525/198; 525/228; 525/230; 525/232; 525/234
[58] Field of Search .................. 523/335; 525/83, 192, 525/198, 228, 230, 232, 234

[56] References Cited

U.S. PATENT DOCUMENTS

| 2,755,270 | 7/1956 | Hayes | 525/83 |
| 4,302,378 | 11/1984 | Lindner et al. | 525/83 |
| 4,376,843 | 3/1983 | Lindner et al. | 525/83 |

Primary Examiner—Jacob Ziegler
Attorney, Agent, or Firm—Connolly and Hutz

[57] ABSTRACT

A process for the production of a pulverulent mixture consisting of (A) from 60 to 99 parts by weight of a brittle copolymer consisting of acrylonitrile and styrene, α-methylstyrene, methyl methacrylate or mixtures thereof, and (B) from 1 to 40 parts by weight of a flexible rubber-elastic polymer, by coagulating, in a first stage, a latex of (A) or a mixture of a latex of (A) and a part of a latex of (B), adding, in a second stage, the latex of (B) or the remaining part of the latex of (B), so that the desired quantity ratio of (A) to (B) is attained, and, in a third stage, separating the precipitated mixture of (A) and (B) from the aqueous phase, and drying it.

2 Claims, No Drawings

THERMOPLASTIC COMPOSITIONS IN POWDER FORM

This invention relates to thermoplastic compositions in powder form which are produced by emulsion polymerization, are based on (α-methyl)styrene copolymers and have improved physical properties, in particular have a reduced tendency to form dust when handled commercially and have an improved processability into thermoplastic compositions. Thermoplastic polymers which have a relatively high dimensional stability under heat and are based on emulsion polymers of (α-methyl)styrene may be obtained as fine powders by coagulation from corresponding polymer latices or polymer latex mixtures. In order that these powders may be used commercially, they must not form dust. The proportion of fine matter thereof must not exceed a certain limit, and they may not contain particles which are too coarse, because such particles may cause problems during theremoplastic processing. The nature of the powders may be influenced within certain limits by the selection of the coagulation conditions of the latices, for example by water:solids ratios, type of electrolyte, concentration of electrolyte and temperature. Nevertheless, the results are unsatisfactory.

This invention provides an improved process for the production of a pulverulent mixture consisting of (A) from 60 to 99 parts by weight of a brittle copolymer consisting of from 35 to 5% by weight of acrylonitrile and from 95 to 65% by weight of styrene, α-methylstyrene, methyl methacrylate or mixtures thereof, and (B) from 1 to 40 parts by weight of a flexible rubber-elastic polymer having a glass transition temperature <20° C., or of a graft polymer, the rubber base of which has a glass transition temperature of <20° C., which is characterised in that in a first stage, a latex of (A) or a mixture of a latex of (A) and a part of the required latex of (B) are coagulated at a temperature of from 20° to 100° C. by the addition of a coagulant, in a second stage, the latex of (B) or the remaining part of the latex of (B) is added, so that the desired quantity ratio of (A) to (B) is obtained, further coagulant and/or water optionally being added simultaneously or thereafter until a solids:water ratio of from 1:3 to 1:15 is attained, and in a third stage, the precipitated mixture of (A) and (B) is separated from the aqueous phase, and is dried.

In the process, from 1 to 20 parts by weight of polymer B, based on 100 parts by weight of the total mixture, are preferably delivered to the second stage of the process. If mixtures of latices of polymers A and B are used in the first stage of the process, the quantity ratios of A:B are preferably selected such that from 1 to 20 parts by weight of B (in the form of a latex) are delivered to the second stage of the process.

In this manner, pourable, non-dust-forming powders are obtained having an average grain diameter of from 0.05 to 4 mm.

Rubber-elastic polymers B which are preferred include the following:

B1: graft polymers of styrene, acrylonitrile, methylmethacrylate or mixtures thereof on diene rubbers, the graft polymers containing >30% by weight of rubber, and B2: rubbers which are diene homopolymers or copolymers (for example with styrene and/or acrylonitrile).

Alkyl acrylate rubbers, in particular polymers of $C_1$-$C_8$ alkyl acrylates are also suitable, and in particular mixtures of B1 and B2.

The component B may also consist of a mixture of ungrafted rubbers, for example ungrafted alkyl acrylate rubbers, in particular in a cross-linked form, and may consist of alkyl acrylate graft rubbers containing from 70 to 95% by weight of rubber.

The polymer powders which are obtained according to the present invention contain from 60 to 99 parts by weight, preferably from 80 to 99 parts by weight, of the thermoplastic copolymer A, and from 1 to 40 parts by weight, in particular from 1 to 20 parts by weight, of the rubber-elastic component B. In stage 2 of the coagulation process, either the complete quantity which is required of the latex of the rubber-elastic polymer B may be added, or part of this quantity, if some of latex B has already been added in stage 1. The method in which all latex B is introduced in stage 2 is preferred.

The coagulations in stages 1 and 2 are either carried out at the same temperature or at different temperatures of from 20° to 100° C., but in particular at a temperature of from 50° to 95° C. The latices of the components A and optionally B which are used are coagulated in a known manner by conventional coagulation means, such as lowering the pH value or adding an electrolyte, for example by the addition of mineral acids or carboxylic acids (acetic acid or formic acid) and/or by the addition of water-soluble salts, such as alkali or alkaline earth metal carboxylic acid salts, inorganic sulphates, chlorides or phosphates, for example magnesium sulphate, sodium chloride, calcium chloride, phosphoric acid, aluminium sulphate or potassium chloride.

A polymer suspension in an aqueous medium exists before stage 2 of the process. More latex is metered in until the desired gross composition according to the present invention is attained. More coagulant may be simultaneously introduced into the suspension, and this coagulant may also be introduced into the suspension after the latex addition of stage 2. During this operation, the polymer powder is produced in the desired form.

The polymer (A+B) solids:water weight ratio is from 1:3 to 1:15, preferably from 1:5 to 1:10.

In stage 3, the finally precipitated polymer suspension, i.e. the suspension of polymer particles in an aqueous medium, is then worked up, for example by filtration and drying. Powders according to the present invention are produced having an average particle diameter of from about 0.05 to 4 mm, in particular from 0.1 to 2 mm.

Coagulation according to the present invention may be carried out in a semi-continuous or in a fully continuous manner, but a continuous method is preferred.

Vinyl polymers A within the context of the present invention consist of from 35 to 5% by weight of acrylonitrile and from 95 to 65% by weight of styrene, α-methylstyrene, methyl methacrylate or mixtures thereof. Preferred polymers contain from 70 to 50 parts by weight of α-methylstyrene, from 20 to 35 parts by weight of acrylonitrile and from 0 to 30 parts by weight of styrene. They may be produced in a known manner by aqueous emulsion polymerisation with radical initiation.

Rubber-elastic polymers B within the context of the present invention are obtainable by aqueous emulsion polymerisation. They have glass transition temperatures $T_g$ of <20° C., in particular from −80° to 0° C. Examples include non-cross-linked, partially cross-linked or highly cross-linked diene homopolymers (for example polybutadiene, polychloroprene and polydimethylbutadiene) or diene copolymers containing up to 50% by weight of styrene, acrylonitrile, methyl methacrylate, alkylacrylate, or vinyl ethers. Butadiene-acrylonitrile copolymers containing from 50 to 95% by weight of gel, and non-cross-linked to highly cross-linked alkyl acrylate rubbers are preferred.

Graft polymers B are graft rubbers, the rubber proportion of which has a glass transition temperature $T_g$ of <20° C., in particular from −80° to 0° C. These graft rubbers preferably contain from 20 to 90% by weight, in particular from 50 to 90% by weight, of rubber. Grafted polymers are derived in particular from vinyl monomers, such as styrene, α-methylstyrene, methyl methacrylate, acrylonitrile and mixtures thereof. Rubber graft bases may be derived from diene homo- or copolymers or they may be diene-free rubbers, in particular based on alkyl acrylates. Preferred graft rubbers are rubber bases containing from 50 to 95% by weight, preferably from 70 to 90% by weight, of gel, and are derived from rubber emulsions having average particle diameters $d_{50}$ of from 0.08 to 0.8 μm, in particular from 0.1 to 0.5 μm.

Components B which are particularly preferred include diene monomer (co)polymers, alkyl acrylate (co)polymers and graft polymers on diene monomer (co)polymers or on alkyl acrylate (co)polymers.

The powders which are produced according to the present invention are distinguished by improved properties, in particular by a reduced tendency to form dust and by an improved pourability. They are generally used as modifiers for other plastics materials, for example for polyvinylchloride, and are distinguished by a particularly favourable behaviour during mixing.

EXAMPLES (I)

(A) Latices of thermoplastic vinyl polymers which are used
  (1) Latex, containing a copolymer of 31% by weight of acrylonitrile and 69% by weight of α-methyl styrene. L value of the polymer=70.
  (2) Latex, containing a copolymer of 30% by weight of acrylonitrile, 20% by weight of styrene and 50% by weight of α-methylstyrene. L value of the polymer=60.

(B) Latices of rubber-elastic polymers or of graft rubbers
  (1) Latex of a graft copolymer of styrene/acrylonitrile (weight ratio: 72:28) on cross-linked polybutadiene having a particle size of 0.4 μm and a gel content of 80% by weight; the graft polymer contains 50% by weight of rubber.
  (2) Latex of a butadiene-acrylonitrile copolymer containing 30% by weight of acrylonitrile and having a particle size of 0.15 μm; the rubber has a gel content of 75% by weight.
  (3) Latex of a poly-n-butyl acrylate, cross-linked with a triallyl cyanurate and having a particle size of 0.35 μm; gel content of the rubber 82% by weight.
  (4) Latex of a cross-linked, coarsely-divided poly-n-butyl acrylate, grafted with a styrene/acrylonitrile mixture (weight ratio: 72:28), having a particle size of 0.4 μm; gel content of the rubber 89%; the graft polymer contains 20% by weight of styrene/acrylonitrile resin.

(II) Production of the Powders

Latices of the polymers A are optionally mixed with latices of the polymers B and are then stabilised with 1.2% of a phenolic antioxidant. The quantities of latex are selected so that there are x parts by weight of polymer A and y parts by weight of polymer B in the latex mixture or in the latex. These latices are then precipitated with stirring at 95° C. using a solution of 150 parts by weight of MgSO$_4$xH$_2$O (Epsom salt) and 50 parts by weight of acetic acid in 5,000 parts by weight of water (based on 1,000 parts by weight of polymer solids of the latices), by mixing the latices with the electrolyte solution. Once all the polymer has coagulated, z parts by weight of polymer B (in the form of a stable latex) are then introduced into the resulting suspension at 95° C. such that the latex coagulates. After coagulation, the complete suspension is heated to 95°–98° C. for half an hour. After cooling to room temperature, it is filtered by centrifuges and is then washed until it is free of electrolyte. The wet material is then dried at 70° C.

(III) Comparative Experiment

In this experiment, latices A are mixed with latices of the polymers B, the quantities of latex being selected such that there are x parts by weight of A and (y+z) parts by weight of B in the mixtures. After stabilizing as in II, the latices are precipitated with an aqueous MgSO$_4$xH$_2$O/acetic acid solution having the same composition as that in II (5200 parts by weight of electrolyte solution are used per 1,000 parts by weight of polymer A+B. After coagulation at 95° C., the complete suspension is heated to 95°–98° C. for half an hour. Further processing is carried out analogously to II.

TABLE 1

| Powder | Parts by weight A (x) | Parts by weight B (y) | Parts by weight B (z) | Process according to II | Process according to III |
|---|---|---|---|---|---|
| 1 | Polymer A$_1$) 95 | — | Polymer B$_2$) 5 | X | |
| 2 | Polymer A$_2$) 90 | — | Polymer B$_2$ 10 | X | |
| 3 | Polymer A$_2$) 73.63 | Polymer 21.37 | Polymer B$_2$) 5 | X | |
| 4 | Polymer A$_1$) 80 | — | Polymer B$_4$) 20 | X | |
| 5 | Polymer A$_1$) 90 | — | Polymer B$_3$) 10 | X | |
| 6 | Polymer A$_1$) 80 | Polymer 10 | Polymer B$_4$) 10 | X | |
| 7 Comparison | Polymer A$_1$) 95 | — | Polymer B$_2$) 5 | | X |
| 8 Comparison | Polymer A$_1$) 90 | — | Polymer B$_2$) 10 | | X |

(V) Properties of the Powders

Grain size analysis of the dry powders IV:

| Grain size (mm) | Percentage (% by weight) |
|---|---|
| | Powder 7: |
| >3.15 | 9.6 |
| 2.0–3.15 | 6.3 |

| -continued | |
|---|---|
| 1.0–2.0 | 19.5 |
| 0.8–1.0 | 6.3 |
| 0.4–0.8 | 17.8 |
| 0.2–0.4 | 18.7 |
| 0.1–0.2 | 14.9 |
| 0.05–0.1 | 5.5 |
| <0.05 | 1.4 |
| Powder 1: | |
| >3.15 | 19.9 |
| 2.0–3.15 | 9.1 |
| 1.0–2.0 | 14.3 |
| 0.8–1.0 | 4.2 |
| 0.4–0.8 | 15.7 |
| 0.2–0.4 | 13.3 |
| 0.1–0.2 | 14.2 |
| 0.05–0.1 | 7.0 |
| <0.05 | 2.3 |

| Dust values of the powders | |
|---|---|
| Powder | Dust value |
| 1 | 8 + 1 |
| 2 | 4 + 1 |
| 3 | 7 + 1 |
| 4 | 1 + 1 |
| 5 | 2 + 1 |
| 6 | 2 + 1 |
| 7 | 74 + 12 |
| 8 | 73 + 12 |

As may be seen from the above Table, powders which have low dust values are obtained according to the present process. Powders 7 and 8 which are to be compared with powders 1 and 2 are, however, powders which have a high tendency to form dust. Presumably, this effect is not only to be attributed to an agglomeration of the fine powder matter. If the powder grain size analyses, for example, of powder I and of powder 7 are compared, the dust-free nature of powder I cannot be readily inferred therefrom. Both powders contain practically identical quantities of fine matter. Thus, the dust-free nature of the powders according to the present invention was surprising.

Moreover, the powders of this invention have an improved, regular pourability, and they are outstandingly suitable as raw materials for thermoplastic mouldings.

(VI) Test Methods and Abbreviations

Grain size analysis:

A testing sieve machine was used. The testing sieve was standardised according to DIN 4188. The sieve machine operated with vibration sieves (manufacturer: Harer & Brecker, Type: EMC. 200-61).

Dust values:

The attenuation of a beam of light passing through a collecting container, which effect is caused by dust being whirled up in this container, is taken as a measurement of the dust value. The dust is produced by dropping powder from a height which is predetermined by the apparatus. The attenuation of the light is measured immediately after the impact of the powder on the bottom of the container, and 30 seconds thereafter. The two values are added together. (The test is carried out with 30 g of powder in a modified dust value measuring device manufactured by Cassella).

The L value corresponds to $\eta$ spec./C where C=5 g/l in methyl ethyl ketone at 25%. The particle diameters are average particle diameters $d_{50}$ (see ultracentrifugation measurements according to W. Scholtan et al., Kolloidz, u. Z. Polymere 250 (1972), 783–796). In the case of emulsions, it was determined by ultracentrifugation measurements, and in the case of powders, by sieve analysis or sedimentation analyses. The $d_{50}$ values are weight averages.

We claim:

1. In an improved process for the production of a pulverulent mixture consisting of
   (A) from 60 to 99 parts, by weight of the pulverulent mixture, of a brittle copolymer consisting of from 35 to 5%, by weight of brittle copolymer, of acrylonitrile and from 95 to 65%, by weight of brittle copolymer, of a monomer of styrene, α-methylstyrene, methyl methacrylate or mixtures thereof; and
   (B) from 1 to 40 parts, by weight of the pulverulent mixture, of a rubber-elastic polymer of (1) a flexible rubber-elastic polymer having a glass transition temperature less than 20° C., (2) a graft polymer, the rubber basis of which has a glass transition temperature of less than 20° C., or mixtures of (1) and (2), the improvement consisiting of;
   in a first stage, a latex of (A) or a mixture of a latex of (A) and a part of a latex of (B) are coagulated by the addition of a coagulant at a temperature of from 20° to 100° C.,
   in a second stage, the latex of (B) or the remaining part of the latex of (B) is added and a sufficient amount of additional coagulent, water or mixtures thereof, is added during the second stage or after the second stage, but before a third stage to obtain a solids to water weight ratio of from 1:3 to 1:15, and
   in a third stage, the precipitated mixture of (A) and (B) is separated from the aqueous phase and dried.

2. A process according to claim 1, wherein (B) consists of
   B1: the graft polymer of styrene, acrylonitrile, methyl methacrylate or mixtures thereof on a diene rubber, containing greater than or equal to 30% rubber, and
   B2: the rubber which is a diene homopolymer or diene copolymer,
wherein the latex of B2 is added in the second stage.

* * * * *